US008060689B2

(12) United States Patent
Kirschner et al.

(10) Patent No.: US 8,060,689 B2
(45) Date of Patent: *Nov. 15, 2011

(54) METHOD FOR MANIPULATING STATE MACHINE STORAGE IN A SMALL MEMORY SPACE

(75) Inventors: Wesley A. Kirschner, Farmington, CT (US); Gary S. Jacobson, Norwalk, CT (US); John A. Hurd, Torrington, CT (US); G. Thomas Atthens, Rotanda West, FL (US); Steven J. Pauly, New Milford, CT (US); Richard C. Day, Jr., Durham, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,101

(22) Filed: May 4, 2010

(65) Prior Publication Data

US 2010/0211726 A1 Aug. 19, 2010

Related U.S. Application Data

(63) Continuation of application No. 11/317,998, filed on Dec. 22, 2005, now Pat. No. 7,747,812.

(51) Int. Cl.
*G06F 12/02* (2006.01)
*G06F 12/12* (2006.01)

(52) U.S. Cl. ........ 711/103; 711/129; 711/133; 711/134; 711/156; 711/159; 711/160; 711/165; 711/166; 711/170; 711/171; 711/E12.006; 711/E12.008

(58) Field of Classification Search .................. 711/103, 711/129, 133, 134, 156, 159, 160, 165, 166, 711/170, 171, E12.006, E12.008
See application file for complete search history.

(56) References Cited

U.S. PATENT DOCUMENTS

| 5,444,631 A | 8/1995 | Vermesse |
| 5,457,658 A | 10/1995 | Niijima et al. |
| 6,513,095 B1 | 1/2003 | Tomori |
| 2005/0216653 A1 | 9/2005 | Aasheim et al. |

FOREIGN PATENT DOCUMENTS

| EP | 0605313 A1 | 7/1994 |
| EP | 0991024 A2 | 4/2000 |

*Primary Examiner* — Midys Rojas
(74) *Attorney, Agent, or Firm* — Michael J. Cummings; Charles R. Malandra, Jr.; Steven J. Shapiro

(57) ABSTRACT

A method includes configuring a flash memory device including a first memory sector having a primary memory sector correspondence, a second memory sector having an alternate memory sector correspondence, and a third memory sector having a free memory sector correspondence, copying a portion of the primary memory sector to the free memory sector, erasing the primary memory sector, and changing a correspondence of each of the first memory sector, the second memory sector, and the third memory sector.

17 Claims, 6 Drawing Sheets

| # | Date Element | Date Type | Description |
|---|---|---|---|
| 1. | Sequence Id Base | UINT 16 | Base offset of Postage State Item (sequence Id/16) |
| 2. | Postage State 0 | BIT [3] | Postage State of Sequence Id (Sequence Id Base * 16 + 0) |
| 3. | Postage State 1 | BIT [3] | Postage State of Sequence Id (Sequence Id Base * 16 + 1) |
| 4. | Postage State 2 | BIT [3] | Postage State of Sequence Id (Sequence Id Base * 16 + 2) |
| 5. | Postage State 3 | BIT [3] | Postage State of Sequence Id (Sequence Id Base * 16 + 3) |
| 6. | Postage State 4 | BIT [3] | Postage State of Sequence Id (Sequence Id Base * 16 + 4) |
| 7. | Postage State 5 | BIT [3] | Postage State of Sequence Id (Sequence Id Base * 16 + 5) |
| 8. | Postage State 6 | BIT [3] | Postage State of Sequence Id (Sequence Id Base * 16 + 6) |
| 9. | Postage State 7 | BIT [3] | Postage State of Sequence Id (Sequence Id Base * 16 + 7) |
| 10. | Postage State 8 | BIT [3] | Postage State of Sequence Id (Sequence Id Base * 16 + 8) |
| 11. | Postage State 9 | BIT [3] | Postage State of Sequence Id (Sequence Id Base * 16 + 9) |
| 12. | Postage State 10 | BIT [3] | Postage State of Sequence Id (Sequence Id Base * 16 + 10) |
| 13. | Postage State 11 | BIT [3] | Postage State of Sequence Id (Sequence Id Base * 16 + 11) |
| 14. | Postage State 12 | BIT [3] | Postage State of Sequence Id (Sequence Id Base * 16 + 12) |
| 15. | Postage State 13 | BIT [3] | Postage State of Sequence Id (Sequence Id Base * 16 + 13) |
| 16. | Postage State 14 | BIT [3] | Postage State of Sequence Id (Sequence Id Base * 16 + 14) |
| 17. | Postage State 15 | BIT [3] | Postage State of Sequence Id (Sequence Id Base * 16 + 15) |

FIG. 1

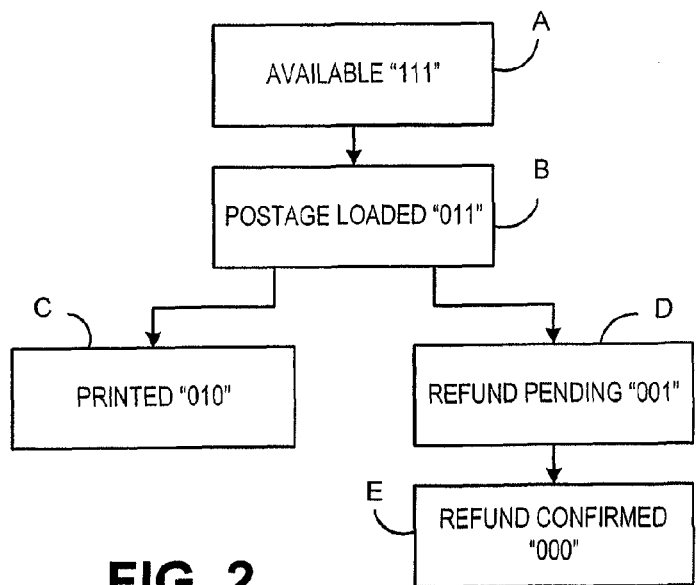

FIG. 2

| Rule Number | Description |
|---|---|
| 1 | Clean the primary sector to the empty sector. |
| 2 | Erase the primary sector. |
| 3 | Update the scrub rules. |
| 4 | Look for available space for file and return sector number of available space. |

FIG. 6

| Designation | Power Up | Scrub 1 | Scrub 2 | Scrub 4 |
|---|---|---|---|---|
| Primary | 1 | 2 | 3 | 1 |
| Alternate | 2 | 3 | 1 | 2 |
| Free | 3 | 1 | 2 | 3 |

FIG. 7

METHOD FOR MANIPULATING STATE MACHINE STORAGE IN A SMALL MEMORY SPACE

RELATED APPLICATIONS

The present application is related to U.S. application Ser. No. 11/317,998, filed Dec. 22, 2005, and assigned to the assignee of the present invention.

FIELD OF THE INVENTION

The present invention relates generally to a method for manipulating data on a flash storage medium.

BACKGROUND INFORMATION

It is known in the art to maintain state machines, typically consisting of state tables, defining the states of elements associated with a system. An example of such a state machine is the collection of state tables forming Postal State Tables (PSTs) stored in flash memory and utilized in postal printing devices. The PSTs maintain data related to the status of purchased postal indicia.

As noted, such state tables are typically stored in flash memory. It is an unfortunate attribute of flash memory that such memory possesses a relatively limited number of erase cycles. For example, flash memory internal to a processor may only allow one hundred erase cycles. The actual number of erase cycles that may be performed before experiencing a significant degradation in the operation of the memory varies. However, when such degradation does occur, the result is an increase in the amount of time to write to the flash memory and to retrieve data from the flash memory. As a result, it is desirable to minimize the number of erase cycles.

In a typical erase cycle, each bit in the flash memory device is set to logical "1". In order to limit the number of erases performed on a flash memory, it is noted that any bit can be transitioned from a one to a zero between erase cycles (or from a zero to a one depending on the flash part). This fact allows multiple writes to occur in a flash memory device between erases. It is therefore preferable to manipulate data stored on a flash memory in a manner requiring only the transition of bits from one to zero. By so doing, one decreases the frequency with which the flash memory requires erasing.

In addition, it is preferable to employ an algorithm to efficiently clean the non-volatile memory (NVM), such as flash memory, such that erases occur only when required. When an erase cycle is needed, it is further preferable to engage in erasing flash memory in such a way that the entire flash memory experiences a generally uniform application of memory erasing.

SUMMARY OF THE INVENTION

In accordance with an exemplary embodiment of the invention, a method includes configuring a flash memory device including a first memory sector having a primary memory sector correspondence, a second memory sector having an alternate memory sector correspondence, and a third memory sector having a free memory sector correspondence, copying a portion of the primary memory sector to the free memory sector, erasing the primary memory sector, and changing a correspondence of each of the first memory sector, the second memory sector, and the third memory sector.

In accordance with an exemplary embodiment of the invention, a program of machine-readable instructions, tangibly embodied on an information bearing medium and executable by a digital data processor, performs actions directed toward managing a flash memory device the actions including configuring a flash memory device to include a first memory sector having a primary memory sector correspondence, a second memory sector having an alternate memory sector correspondence, and a third memory sector having a free memory sector correspondence, copying a portion of the primary memory sector to the free memory sector, erasing the primary memory sector, and changing a correspondence of each of the first memory sector, the second memory sector, and the third memory sector.

In accordance with another exemplary embodiment of the invention, a system includes a flash memory device including a first memory sector having a primary memory sector correspondence, a second memory sector having an alternate memory sector correspondence, and a third memory sector having a free memory sector correspondence, means for copying a portion of the primary memory sector to the free memory sector, means for erasing the primary memory sector, and means for changing the correspondence of each individual one of the first memory sector, the second memory sector, and the third memory sector.

BRIEF DESCRIPTION OF THE DRAWINGS

The foregoing aspects and other features of the invention are explained in the following description, taken in connection with the accompanying drawings, wherein:

FIG. 1 is a diagram of an exemplary embodiment of a hardware configuration for practicing the invention.

FIG. 2 is a flowchart of an exemplary embodiment of a Postal State Table (PST) of the invention.

FIG. 6 is an illustration of an exemplary embodiment of rules employed during a scrub operation according to the invention.

FIG. 7 is an illustration of an exemplary embodiment of scrub rules of the invention.

DETAILED DESCRIPTION

Figure 3:
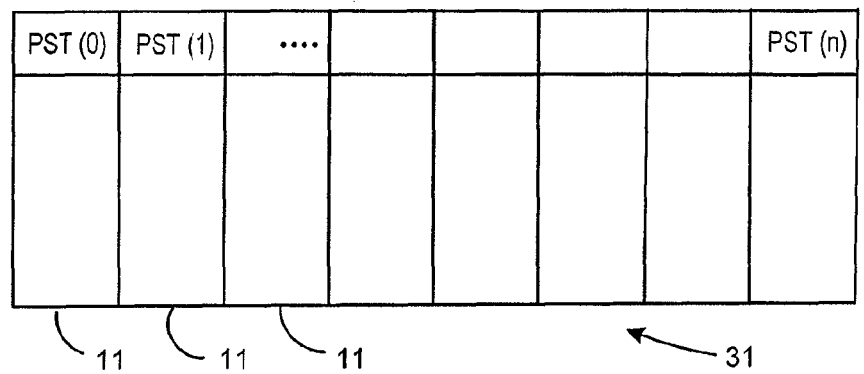
FIG. 3 is an exemplary embodiment of a PST file of the invention.

In exemplary embodiments of the invention, a method is provided for managing, and otherwise manipulating, data stored in flash memory. In particular, there is provided a method for storing data and coalescing stored data in a manner so as to reduce the need for erase cycles applied to the flash memory. In one exemplary embodiment, there is utilized the design and implementation of state table data requiring only the alteration of binary ones to binary zeros as the print states to which the state table data refers change from one to another. In addition, exemplary methodologies are provided for coalescing needed data so as to reduce the incidence of erase cycles. While described with reference to PSTs utilized in the operation of postal meters, the invention is not so limited. Rather, the invention is drawn broadly to cover any and all data stored on an electronic memory device, particularly a flash memory device.

Broadly stated, and described more fully below, exemplary embodiments of the invention operate to partition an NVM into a plurality of sectors and to clean such sectors in a manner that exercises each sector to an approximately equal extent.

With reference to FIG. 1, there is illustrated an exemplary embodiment of a postal state table (PST) 11. As illustrated, each PST 11 is formed of a two byte (16 bit) Sequence ID, providing a unique value for accessing a particular PST 11, followed by sixteen Postage State data elements 15 each of a size of three bits (48 bits in total). As a result, the exemplary PST 11 is 64 bits, or eight bytes, in size. As constructed, each Postage State data element 15 can be accessed as an offset from the starting memory location in which PST 11 is stored. Each Postage State data element 15 represents a single purchased postage with the bit pattern forming the three bits of the Postage State data element 15 indicating the status of the purchased postage.

As each Postage State data element 15 is formed of three bits, it is possible to represent up to eight separate states (binary 000 through binary 111). As noted above, the frequency of erase cycles can be reduced if the transition between states involves only the changing of bits with a value of "1" to a value of "0". With reference to FIG. 2, there is illustrated an exemplary embodiment of the transitions between the different values for Postage State data elements 15 of a PST 11. As illustrated the binary designations for each possible state are as follow:

| | |
|---|---|
| Available | 111 |
| Postage Loaded | 011 |
| Printed | 010 |
| Refund Pending | 001 |
| Refund Confirmed | 000 |

Note that the transition from Block A to Block B, corresponding to the transition from "Available" to "Postage Loaded" requires changing only the first bit from one to zero. Likewise, transitioning from "Postage Loaded" to either "Printed" or "Refund Pending", at Block C and Block D respectively, similarly requires changing only one bit from one to zero. Lastly, transitioning from "Refund Pending" to "Refund Confirmed" at Block E requires changing only one bit from one to zero. In this manner, the status, or state, of a purchased postage, stored in a Postage State data element 15, can be transitioned from an initial status of "Available" to a final status of either "Printed" or "Refund Confirmed" without the need to change any bits comprising a Postage State data element 15 from zero to one. Specifically, none of the three bits defined as the data type 5 for a postage state 7 require being changed from a bit value of "0" to a bit value of "1" as the postage state 7 transitions from one state to the next.

With reference to FIG. 3, there is illustrated an exemplary embodiment of a PST file 31. Each PST file 31 is formed of more than one PST 11. Each PST file 31 is arranged such that that its component PSTs 11 are stored in contiguous memory of the memory medium on which they are stored. Typical, but non-limiting, sizes for PST files 31 utilized in conjunction with flash memory include 128 bytes, 256 bytes, and 1024 bytes formed of 16, 32, 128 PSTs 11 respectively.

Upon erasure and initial allocation of a PST file 31, every bit is set to a value of "1". In the exemplary embodiment illustrated, each state is thereby initially set to "Available". As discussed more fully below, during the process of printing postage indicia, the state variables are updated as the value of each Postage State data element 15 is transitioned to reflect a current status.

Figure 4:
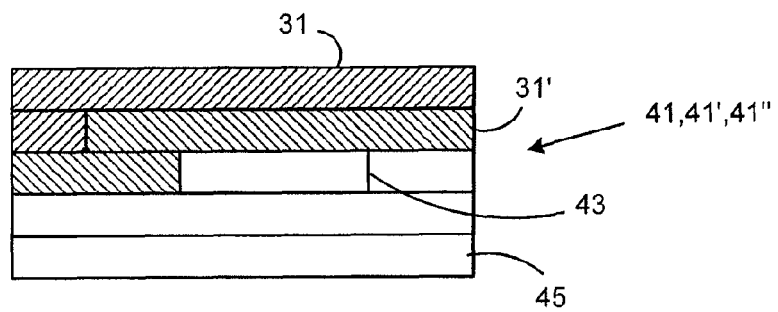
FIG. 4 is an exemplary embodiment of a memory sector of the invention.

With reference to FIG. 4, there is illustrated an exemplary embodiment of a memory sector 41. Memory sector 41 is a portion of contiguous memory of a defined size. In operation, the size of a memory sector 41 can depend upon the physical structure of the memory device upon which memory sector 41 is defined, as well as the logical requirements attendant to the structure of the data to be stored upon it. Quite often, a memory sector 41 is of the minimum size that can be erased on the memory medium. As illustrated, memory sector 41 is of a size sufficient to store a plurality of PST files 31, 31' as well as an overhead portion 43. There is additionally illustrated unused space 45. Overhead portion 43 can store any data not forming a part of a PST file 31. Overhead portion 43 can include, but is not limited to, the value of parameters related to one or more PST file 31, 31'. Unused space 45 is formed of contiguous, unallocated data storage space in which there is not stored valid data.

Figure 5:
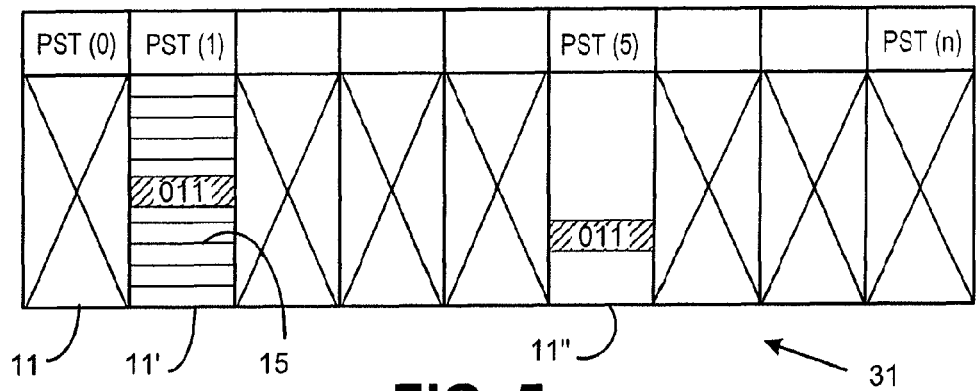
FIG. 5 is an exemplary embodiment of a PST file of the invention illustrating both "dirty" and "active" PSTs.

With reference to FIG. 5, there is illustrated an exemplary embodiment of a PST file 31 wherein, over the course of operation, the status of individual Postage State data elements 15 has been changed to a value other than binary "111". As illustrated, PSTs 11 wherein every component Postage State data element 15 has been transitioned to a status of either binary "010" or binary "000", corresponding to "Printed" and "Refund Confirmed" respectively, are indicated by an "X" drawn through the status fields. As such, the "X" indicates that the PST 11 requires no further updates to any component Postage State data element 15, and, as such, can be erased without the possibility of losing required data. As used herein, "dirty" refers to such PSTs 11 as can be erased. Note however, that, in this example, two PSTs 11',11" each have at least one Postage State data element 15 in a transient state with a binary value indicative of "Postage Loaded" and which has neither been "Printed" nor had a "Refund Confirmed". As used herein, "active" refers to such PSTs 11',11" that cannot be erased without the loss of required data.

As illustrated, these two Postage State data elements 15, comprising only six total bits, prohibit the erasure of the entire memory sector 41 upon which they are stored. As a result, a relatively large amount of memory is prevented from being freed up, via erasure, in order to maintain these six bits of residual data. While illustrated as a single memory sector 41, it is possible to define a plurality of memory sectors 41 on a single memory device, such as a flash memory.

In an exemplary embodiment of the invention, a method is provided for manipulating data stored on a plurality of memory sectors that limits the number of required erases and minimizes the memory footprint needed to store required data. Broadly stated, and described more fully below, a method of the invention defines at least three memory sectors 41 and cleans each sector in a manner that serves to equally exercise each memory sector 41. As defined herein, a "clean operation" refers to a procedure consisting of multiple "moves" wherein each move involves the movement of required data from one place in a memory device to another. As described more fully below, use is made of a PST coalescing function when performing such moves. More specifically, each "move" involves the transfer of a PST file 31, one or more PSTs 11, or any other data from one memory sector 41 to another memory sector 41. Each move involves rewriting only in-use NVM files to a new sector.

In practice, three memory sectors 41,41',41" are designated with one each being designated as primary, alternate, and free. When an attempt is made to add a PST file 31, or other data, to a memory sector 41, the three memory sectors 41,41', 41" are examined for available space as follows. First, the primary memory sector 41 is queried for space. If sufficient space is available on the primary memory sector 41, the PST file 31 is added to the primary memory sector 41. If insufficient space exists on the primary memory sector 41, the alternate memory sector 41" is queried for available space. If sufficient space is available on the alternate memory sector 41", the PST file 31 is added to the alternate memory sector 41". If insufficient space exists on the alternate memory sector 41,41',41" the three memory sectors 41 undergo a scrub operation whereby sufficient memory space is sought.

During a scrub operation, the exemplary rules illustrated in FIG. 6 are utilized to determine which operations are performed on which memory sectors 41,41',41". First, in accordance with rule 1, the primary memory sector 41 is cleaned to the free memory sector 41. As described more fully below, this "cleaning" involves a process termed "coalescing". Next, in accordance with rule 2, the primary memory sector 41 is erased. As noted above, the process of erasing involves setting every bit in the primary memory sector 41 to binary value "1" and, hence, all data stored on primary memory sector 41 prior to erasure is lost. Next, in accordance with rule 3, the scrub rules are updated.

With reference to FIG. 7, there is illustrated an exemplary embodiment of the scrub rules. At power up, a first memory sector, designated with a "1", is defined to be the primary memory sector 41. A second memory sector, designated with a "2", is defined to be the alternate memory sector 41'. Lastly, a third memory sector, designated with a "3", is defined to be the free memory sector 41". After a scrub operation is performed, the designations of the memory sectors 41,41',41" are changed. Specifically, the first memory sector is newly designated the free memory sector 41", the second memory sector is newly designated the primary memory sector 41, the third memory sector is newly designated the alternate memory sector 41'. As illustrated, this re-designation is continued after each performance of a scrub operation such that, after three such scrub operations, the original designations of each memory sector 41 are once again in force.

With continued reference to FIG. 6, in accordance with rule 4, after updating the scrub rules, available space for storing the PST file 31 is sought, and, if found, the sector number upon which space was found is returned, such as to a processor coordinating the clean operation. Note that, in accordance with the scrub rules of FIG. 7, each memory sector 41 is erased only upon each third scrub.

As noted above, regarding the format of PST files 31, each PST file 31 is a collection of PSTs 11. During operation, PST files 31 are periodically cleaned such as when postage is purchased after the PST file 31 is uploaded to a server. During such an operation, a PST file 31 can be deleted if all of the postage values corresponding to the Postage State data elements 15 have been either printed or refunded. Once a PST file 31 has been deleted, it can be cleaned on the next scrub.

As noted above when discussing FIG. 5, it is often times the case that a PST file 31 occupies a substantial space while only a relatively few PSTs 11 contain Postage State data elements 15 corresponding to a postage value that has not been printed or refunded. During a clean operation, each PST file 31 is examined to determine if it should be deleted, left alone, or coalesced. The process of coalescing is illustrated with reference to FIG. 8 wherein there is illustrated a coalesce PST file 81. In an exemplary embodiment, coalesce PST file 81 is derived from the process of coalescing applied to the PST file 31 of FIG. 5. As illustrated, the active PSTs 11 from PST file 31 have been coalesced and transferred into coalesce PST file 81 such that coalesce PST file 81 consists only of active PSTs 11',11".

While it is possible to apply the process of coalescing to any PST file 31 containing at least one active PST 11, it is preferable to apply coalescing to PST files 31 in accordance a set of coalescing criteria. Examples of such criteria include that, prior to coalescing any PST files 31 on a memory sector 41, all but one of the component PSTs 11 be marked "dirty" and there must be at least three PST files 31 in use on the memory sector 41. An exception to such criteria is that no coalescing is to be performed if the last PST 11 in a PST file 31 is "active". In normal usage, this condition is often the case and, thus, such an exception avoids unnecessary moving of data. Such criteria are presented for exemplary purposes only and can be altered or modified as desired to control the erasure of memory sectors 41

Figure 8:
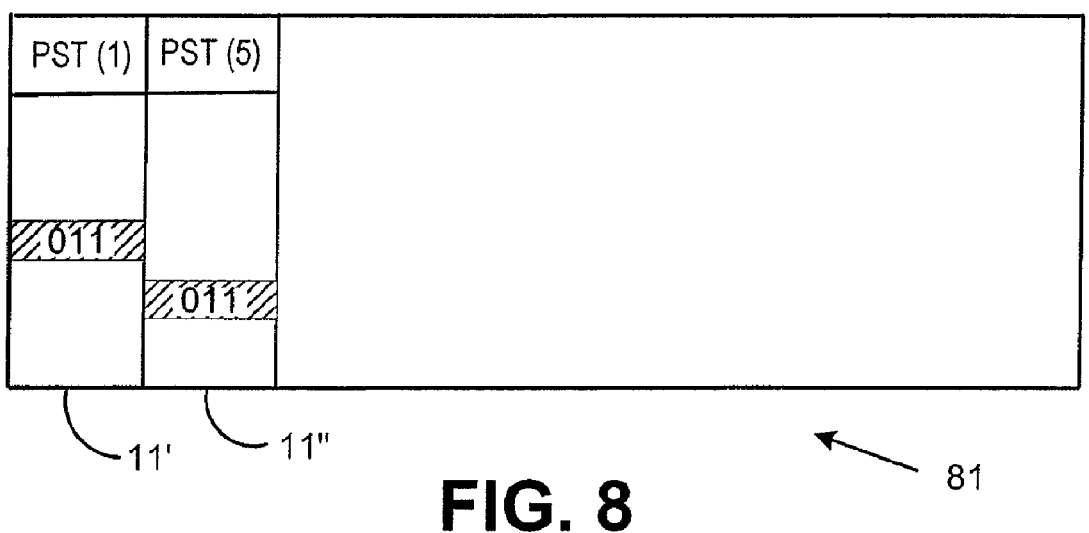
FIG. 8 is an illustration of an exemplary embodiment of a coalesce file according to the invention.

With continued reference to FIG. 8, coalesce PST file 81 is grouped with other PST files 31 on the memory sector 41 on which it resides. As such, coalesce PST file 81 requires no special handling, and memory management of the coalesce PST file 81 can be performed using operations employed when managing any other PST file 31. As the coalesce PST file 81 may be only partially filled with state table data upon creation, the remaining empty, or unallocated, space forming coalesce PST file 81 serves as a place holder for other PSTs 11 to be added upon future applications of the coalesce process. As such, coalesce PST files 81 are created and deleted on an as needed basis.

Figure 9:
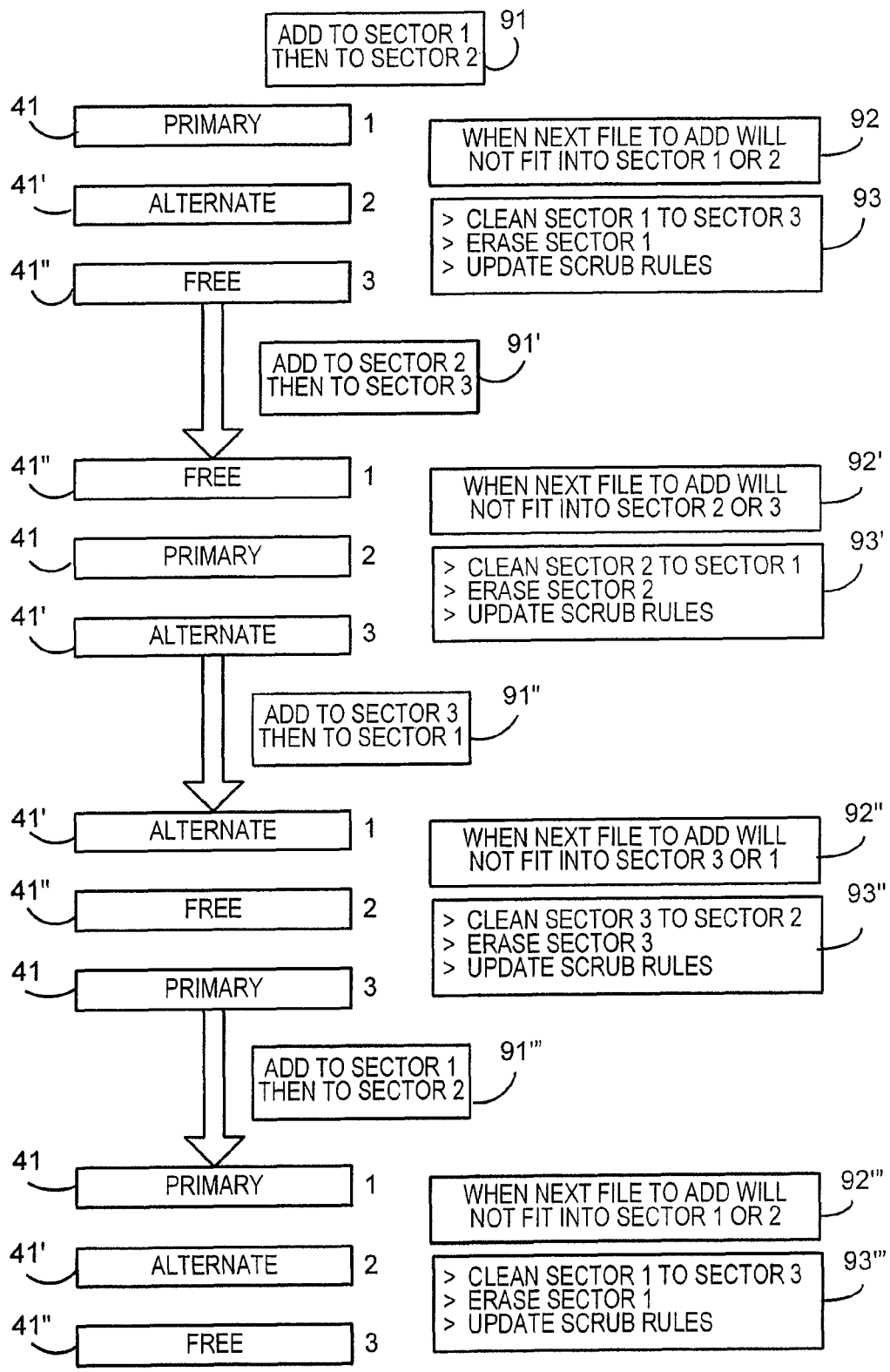
FIG. 9 is a flowchart of an exemplary embodiment of a scrubbing operation of the invention.

With reference to FIG. 9, there is illustrated in detail an exemplary embodiment of a method of the invention showing a complete scrubbing cycle consisting of three scrub operations. As illustrated, there are a plurality of operation descriptions 91-91''' each associated with a configuration of memory sectors 41 and their designations (primary, alternate, and free). Each operation description 91-91''' defines an operation of memory allocation prior to the occurrence of a corresponding trigger condition 92-92'''. For example, operation description 91 specifies that data is added to sector one and then to sector two until the data to be added will longer fit on either sector as specified in trigger condition 92. When trigger condition 92 is met, the rules embodied in rules 93 are performed and a new set of operations, defined by operation description 91' is put into practice. This process repeats itself as shown.

Figure 10:
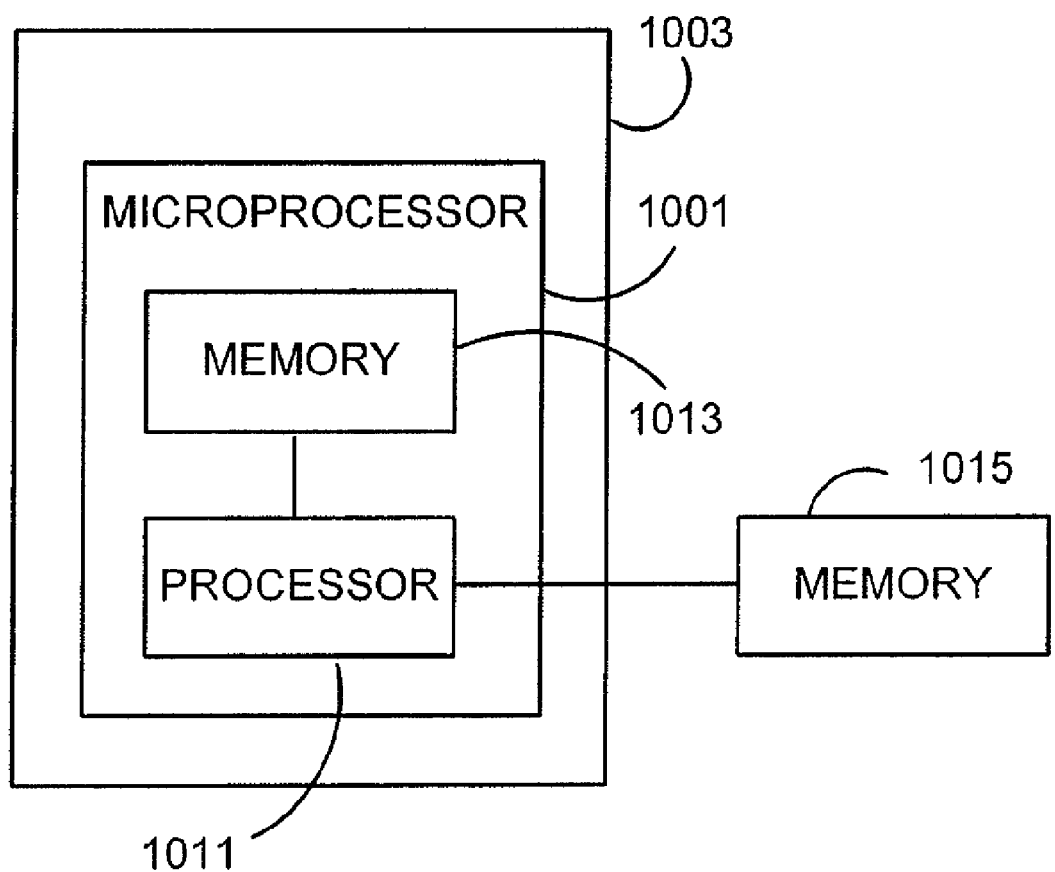
FIG. 10 is a diagram of an exemplary embodiment of a hardware configuration of the invention.

With reference to FIG. 10, there is illustrated an exemplary embodiment of a hardware configuration for practicing the invention. A processing unit 1011 is coupled to an internal memory device 1013. By "internal" it is meant that processing unit 1011 can communicate with internal memory device 1013 without the use of an external bus or other communication link permitting external examination of such communications. Processing unit 1011 can be, but is not limited to, a CPU fabricated to form a part of microprocessor 1001. Internal memory device 1013 is preferably formed of flash memory. Processor 1011 can be additionally coupled to an external memory device 1015. In operation, processor 1011 executes a program or programs, comprised of machine readable code embodied in a tangible, electronic format, to manipulate and otherwise manage the storage of data upon the memory devices 1013,1015 as described above. In an exemplary embodiment, processor 1011 and memory device 1015 form a part of a postal security device (PSD) operating to enable the secure printing of postage indicia.

While illustrated with application to flash memory devices, the invention is applicable to all other forms of memory devices, such as, for example, RAM. In addition, while described with reference to relatively small, embedded devices, the method of the invention is scale independent. In addition, the method of the invention can be parameterized to different trigger points so as to create the coalesce PST file 81 depending on a state of one or more PSTs 11. In addition, the above described exemplary embodiments of the invention can be implemented as programs running on a processor 1011 that are run as background tasks. In addition, if such programs are stored in internal memory.

While certain of the embodiments have been described in terms of flash memory storage of program instructions, the embodiments can alternatively be utilized with other appropriate storage technology such as RAM storage, EEPROM storage, ROM storage or mirrored RAM storage that mirrors flash when running.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for manipulating state machine data storage in a memory space, wherein the data may include both active and inactive data, and whereby inactive data is removed to make room for new active data while managing erase cycles, the method comprising:
   configuring a memory device to comprise a first memory sector having a primary memory sector correspondence, a second memory sector having an alternate memory sector correspondence, and a third memory sector having a free memory sector correspondence;
   receiving new active data for storage;
   determining whether the new active data will fit into either of the primary and alternative memory sectors;
   if the step of determining determines that the new active data will not fit in either of the primary or alternative memory sectors, then performing the following steps (a)-(c);
   (a) copying a portion of said primary memory sector to said free memory sector, said portion including active data;
   (b) writing the new active data to the free memory sector;
   (c) updating the correspondence of each individual one of said first memory sector, said second memory sector, and said third memory sector.

2. The method of claim 1 wherein said updating comprises:
   designating said one of said first memory sector, said second memory sector, and said third memory sector corresponding to said primary memory sector as said free memory sector;
   designating said one of said first memory sector, said second memory sector, and said third memory sector corresponding to said alternate memory sector as said primary memory sector; and
   designating said one of said first memory sector, said second memory sector, and said third memory sector corresponding to said free memory sector as said alternate memory sector.

3. The method of claim 1 comprising storing at least one data file on said primary memory sector.

4. The method of claim 3 wherein the memory device comprises a flash memory device and storing said at least one data file comprises storing at least one data file comprising a plurality of state tables.

5. The method of claim 4 comprising storing said plurality of state tables comprising a plurality of state tables (PSTs).

6. The method of claim 4 wherein said copying comprises at least one of said state tables comprising an active state table.

7. The method of claim 6 wherein said copying is performed in response to attempting to store said at least one data file on said primary memory sector and said alternate memory sector.

8. The method of claim 6 wherein said copying said at least one active state table is performed in response to applying at least one coalesce criteria to said at least one data file comprising said at least one active state table.

9. A system for manipulating state machine data storage in a small memory space, wherein the data may include both active and inactive data, and whereby inactive data is removed to make room for new active data while minimizing a number of erase cycles, the system comprising:
   a flash memory device comprising a first memory sector having a primary memory sector correspondence, a second memory sector having an alternate memory sector correspondence, and a third memory sector having a free memory sector correspondence;
   a processor configured to manage the flash memory device by performing the following steps:
   receiving new active data for storage;
   determining whether the new active data will fit into either of the primary and alternative memory sectors;
   if the means for determining determines that the new active data will not fit in either of the primary or alternative memory sectors, then performing the following steps (a)-(c)
   (a) copying a portion of said primary memory sector to said free memory sector if the means for determining determines that the new active data will not fit in either of the primary or alternative memory sectors, said portion including active data;
   (b) writing the new active data to the free memory sector if the means for determining determines that the new active data will not fit in either of the primary or alternative memory sectors; and
   (c) changing the correspondence of each individual one of said first memory sector, said second memory sector, and said third memory sector.

10. The system of claim 9 comprising a postal security device (PSD).

11. The system of claim 9 wherein said processor is further configured for:
    designating said one of said first memory sector, said second memory sector, and said third memory sector corresponding to said primary memory sector as said free memory sector;
    designating said one of said first memory sector, said second memory sector, and said third memory sector corresponding to said alternate memory sector as said primary memory sector; and
    designating said one of said first memory sector, said second memory sector, and said third memory sector corresponding to said free memory sector as said alternate memory sector.

12. The system of claim 9 wherein the processor is further configured for storing at least one data file on said primary memory sector.

13. The system of claim 12 wherein the memory device comprises a flash memory device and the processor is configured for storing said at least one data file comprises means for storing at least one data file comprising a plurality of state tables.

14. The system of claim 13 wherein the processor is further configured for storing said plurality of state tables comprising a plurality of state tables (PSTs).

15. The system of claim 13 wherein said configured step of copying by the processor comprises at least one of said state tables comprising an active state table.

16. The system of claim 15 wherein said configured step of copying by the processor copies responsive to an attempt to store said at least one data file on said primary memory sector and said alternate memory sector.

17. The system of claim 15 wherein said configured step of copying by the processor, of said at least one active state table is performed in response to applying at least one coalesce criteria to said at least one data file comprising said at least one active state table.

\* \* \* \* \*

UNITED STATES PATENT AND TRADEMARK OFFICE
CERTIFICATE OF CORRECTION

| | | |
|---|---|---|
| PATENT NO. | : 8,060,689 B2 | Page 1 of 1 |
| APPLICATION NO. | : 12/773101 | |
| DATED | : November 15, 2011 | |
| INVENTOR(S) | : Wesley A. Kirschner et al. | |

It is certified that error appears in the above-identified patent and that said Letters Patent is hereby corrected as shown below:

On the Title page, item [75], the inventor: "G. Thomas Athens" is incorrectly shown as "G. Thomas Atthens"

Signed and Sealed this

Seventh Day of August, 2012

David J. Kappos
*Director of the United States Patent and Trademark Office*